United States Patent
Getachew et al.

(10) Patent No.: US 9,760,646 B1
(45) Date of Patent: Sep. 12, 2017

(54) CARD ISSUANCE USING CARD FEATURE VERIFICATION

(71) Applicant: BANK OF AMERICA CORPORATION, Charlotte, NC (US)

(72) Inventors: Kirubel Getachew, Garland, TX (US); Murali Sampath, Flower Mound, TX (US); Greg Correro, Oak Point, TX (US); Andrew B. Glassman, Charlotte, NC (US); Anish Abraham, Sunnyvale, TX (US); Andy Anderson, McKinney, TX (US); Glenn Hupfer, Highland Village, TX (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 15/164,417

(22) Filed: May 25, 2016

(51) Int. Cl.
| | |
|---|---|
| *G06K 7/10* | (2006.01) |
| *G06F 17/30* | (2006.01) |
| *G06K 7/14* | (2006.01) |
| *G06K 19/06* | (2006.01) |
| *G06K 7/08* | (2006.01) |

(52) U.S. Cl.
CPC ....... *G06F 17/30879* (2013.01); *G06K 7/087* (2013.01); *G06K 7/1417* (2013.01); *G06K 19/06037* (2013.01)

(58) Field of Classification Search
USPC .................................. 235/488, 375; 709/206
See application file for complete search history.

(56) References Cited

U.S. PATENT DOCUMENTS

| | | | |
|---|---|---|---|
| 6,749,113 B2 | 6/2004 | Hogan et al. | |
| 8,468,072 B2 | 6/2013 | Cleary et al. | |
| 8,919,643 B2 | 12/2014 | Ashfield | |
| 2004/0205138 A1* | 10/2004 | Friedman | G06Q 30/02 709/206 |
| 2012/0217303 A1* | 8/2012 | Krawczewicz | G06Q 30/0207 235/488 |
| 2014/0124571 A1* | 5/2014 | Laackmann | G06K 7/0004 235/375 |
| 2014/0160129 A1* | 6/2014 | Sako | G06F 3/011 345/427 |

OTHER PUBLICATIONS

Kirubel Getachew et al., U.S. Appl. No. 15/164,279, Patent Application "Resolving Card Malfunctions Using Card Information Access Control.", May 25, 2016.

* cited by examiner

*Primary Examiner* — Allyson Trail
(74) *Attorney, Agent, or Firm* — Michael A. Springs

(57) ABSTRACT

A card generating system that includes a card information database and a card processing system. The card processing system comprises an interface, a vision system, a processor, and card processing hardware. The interface is configured to receive card requests. The vision system is configured to process two-dimensional barcodes to obtain card feature data. The processor is operably coupled to the interface, the vision system, and card processing hardware. The processor is configured to select a card comprising a two-dimensional barcode based on the card request and to obtain a card data file corresponding with the card request. The processor is further configured to compare card feature data to the card data file and to determine whether the card feature data corresponds with the card data file. The card processing hardware is configured to process the card in response a determining the card feature data corresponds with the card data file.

17 Claims, 6 Drawing Sheets

CARD ISSUANCE USING CARD FEATURE VERIFICATION

TECHNICAL FIELD

The present disclosure relates generally to hardware protection and information security, and more specifically to using access control of user information and card information.

BACKGROUND

Existing card issuing systems experience a high percentage of misreads, for example, due to vision cameras not picking up different shades of font print, misinterpreting characters, or misinterpreting the placement of the card type number on cards. Misreads may decrease the system's performance and the speed of the system's throughput rate. Misreads may also trigger frequent manual intervention and usage of override functions, which may increase the chances of a wrong card type being issued due to human error. Thus, it is desirable to provide the ability to improve the accuracy and performance of card issuing systems.

Troubleshooting card problems may involve various types of information associated with a card. User devices have limited amounts of memory and may be unable to store all of the possible information associated with a card. Storing card information on the user device may also make the user device vulnerable to unauthorized users, for example, if the user device is stolen or lost. Unauthorized access to stored information may compromise the privacy and security of user information and/or card information. Thus, it is desirable to provide the ability to securely access control to user information and card information.

SUMMARY

In one embodiment, the disclosure includes a card generating system that includes a card information database operable to store card data files and a card processing system operably coupled to the card information database. The card processing system comprises an interface, a vision system, a processor, and card processing hardware. The interface is configured to receive a card request. The vision system is configured to process two-dimensional barcodes to obtain card feature data. The processor is operably coupled to the interface, the vision system, and card processing hardware. The processor is configured to select a card comprising a two-dimensional barcode based on the card request and to obtain a card data file corresponding with the card request. The processor is further configured to compare card feature data to the card data file and to determine whether the card feature data corresponds with the card data file. The card processing hardware is configured to process the card in response a determining the card feature data corresponds with the card data file.

In another embodiment, the disclosure includes an apparatus that includes an interface, a vision system, a processor, and card processing hardware. The interface is configured to receive a card request. The vision system is configured to process two-dimensional barcodes to obtain card feature data. The processor is operably coupled to the interface, the vision system, and card processing hardware. The processor is configured to select a card comprising a two-dimensional barcode based on the card request, to compare card feature data to a card data file corresponding with the card request, and to determine whether the card feature data corresponds with the card data file. The card processing hardware is configured to process the card in response a determining the card feature data corresponds with the card data file.

In yet another embodiment, this disclosure includes a card generating method that includes receiving a card request, selecting a card comprising a two-dimensional barcode based on the card request, processing the two-dimensional barcode to obtain card feature data. The method further includes comparing the card feature data to a card data file corresponding with the card request, determining whether the card feature data corresponds with the card data file, and processing the card in response to determining the card feature data corresponds with the card data file.

The present embodiment presents several technical advantages. In one embodiment a card issuing system provides increased card issuing performance using two-dimensional (2D) barcodes. Using 2D barcodes may reduce read errors and the frequency of manual interventions, and thereby increase the efficiency and throughput rate of a card processing or issuing system. In one embodiment, information associated with a card may be accessed and distributed using 2D barcodes. Using 2D barcodes for card information protects the security of the card information while making the card information accessible, for example, when diagnosing and resolving issues with a card. One or more security protocols may be employed to protect user information associated with a card. The user information may provide the user with privacy and protection while also making the user information accessible. User information may be combined with the card information and securely communicated across a network.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
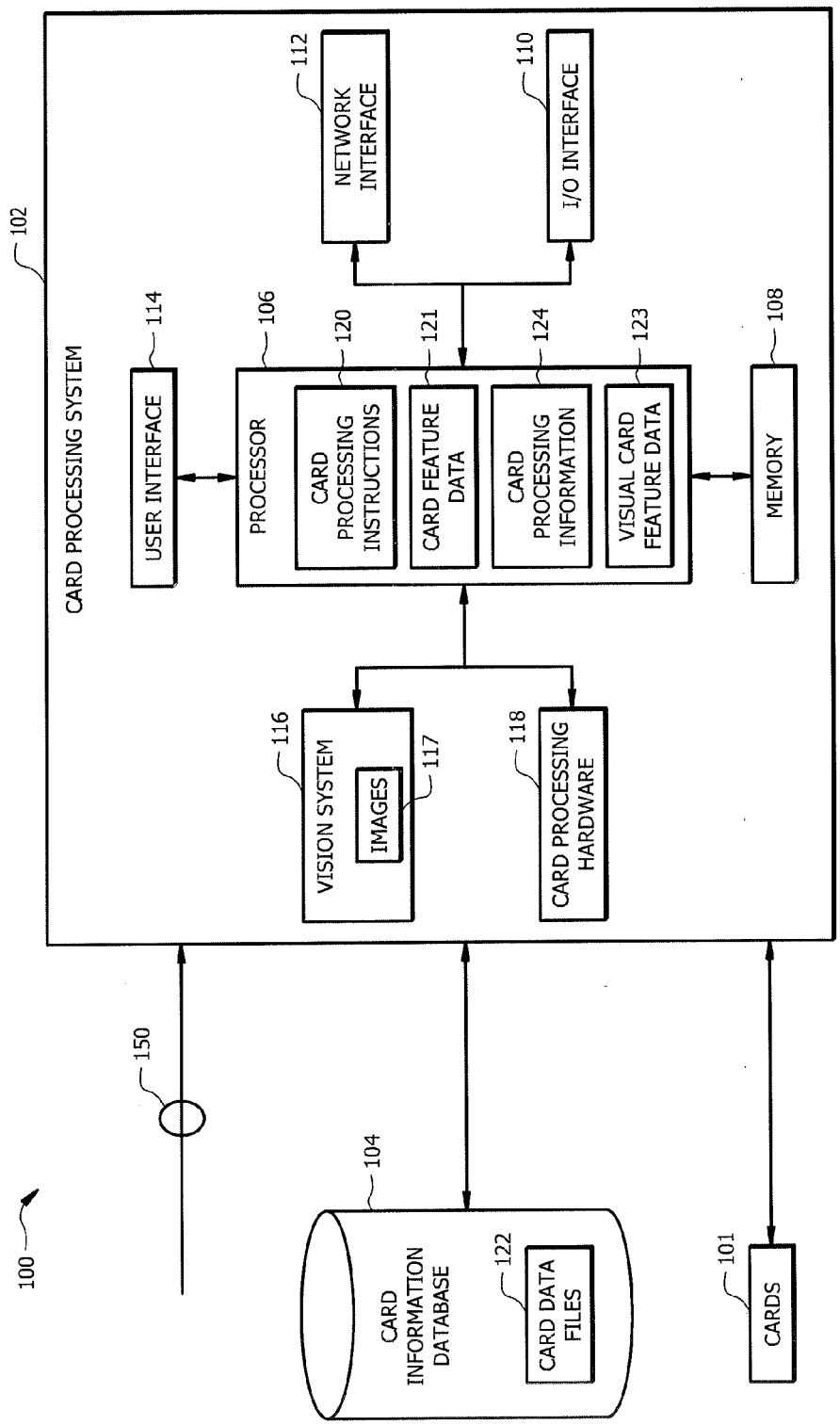
FIG. 1 is a schematic diagram of an embodiment of a card issuing system.

Processing cards for issuing quickly and efficiency provides several technical problems and challenges. For example, card processing systems may experience a high percentage of misreads, for example, due to vision cameras not picking up different shades of font print, misinterpreting characters, or misinterpreting the placement of the card type number on cards. Card misreads may reduce the card processing system's performance and/or reduce the speed of the card processing system's throughput rate. For example, the operating speed of a card processing system may be limited by the card processing system's ability to accuracy read card information. Card processing systems may also be unable to resolve card misread problems and/to detect card misread problems, which may result in down time while an operator troubleshoots and resolves any problems with the card processing system.

In one embodiment, a card processing system may be employed to process cards using 2D barcodes on the cards. The 2D barcodes may be associated with various information about the card, for example, the card configuration or card design. The card processing system may select cards in response to card requests and may use information obtained from a 2D barcode on the card to verify that the selected card corresponds with the card requested in the card request. The card processing system may then process the selected card upon determining that the selected card corresponds with the requested card. A card processing system configured to obtain and use information from 2D barcodes provides a technical solution to the previously discussed technical problems and improves the accuracy and performance (e.g. throughput) of the card processing system. For example, the card processing system may be able to detect and/or avoid card misreads by using 2D barcodes. Detecting and avoiding card misreads improves the accuracy of the card processing system and thereby improves the speed and throughput of the card processing system. The card processing system also resolves potential card misreads using 2D barcodes which can reduce the amount of down time a card processing system experiences and improve the throughput of the card processing system.

Another technical problem and challenge associated with cards may occur when trying to troubleshoot and resolve issues associated with a card. Troubleshooting and resolving card issues may involve various types of information (e.g. user information and/or card information) associated with a card. A card user may be unaware of some of this information, such as card processing information or information about hardware configurations of a card. User devices have limited amounts of memory and may be unable to store all of the possible information associated with a card. Storing user information and card information on a user device may also make the user device vulnerable to unauthorized users, for example, if the user device is stolen or lost. Unauthorized access to stored information may compromise the privacy and security of user information and/or card information.

In one embodiment, a user device may be employed to process 2D barcodes on a user's card to collect information associated with the card and to transmit the information to an institution associated with the card to diagnose and/or resolve issues with the card. The 2D barcodes may be associated with various information about the card, for example, information about the processing of the card and/or information about the card's configuration or design. The user device may collect information obtained from one or more 2D barcodes on a card, as well as user information, to send to an institution associated with the card to diagnose and resolve issues with the card. A user device configured to collect information from 2D barcodes provides a technical solution to the previously discussed technical problems and improves the security of user information and/or card information that may be collected and distributed. For example, the user device may use 2D barcodes to collect information associated with a card without having all of the information stored on the user device. The ability to collect information without having to store the information allows the user device to use less memory. Additionally, the user device may provide increased security of user information and/or card information from unauthorized users since less information may be stored on the user device.

FIG. 1 is a schematic diagram of an embodiment of a card issuing system 100. The card issuing system 100 may be configured to process and issue cards 101. Examples of cards 101 may include, but are not limited to, credit cards, debit cards, pre-paid card, and gift cards. An operator may employ the card issuing system 100 to process a card 101 to be issued to a card user. For example, an operator may generate and/or send a card request 150 to the card issuing system 100 to request a card 101 to be processed for issuing to a card user. The card issuing system 100 is configured to output a processed card 101 to the operator in response the card request 150. The processed card 101 may be configured for a particular card user based on the card request 150. For example, the card 101 may be encoded, programmed, and/or stylized for a particular card user. Cards 101 may be obtained by the card issuing system 100 from a card repository comprising a plurality of different types of cards 101.

The card issuing system 100 may comprise card processing system 102 and a card information database 104. The card issuing system 100 may be configured as shown or in any other suitable configuration. For example, the card information database 104 may be incorporated or integrated with the card processing system 102.

The card processing system 102 may be configured to process cards 101 for issuing. For example, the card processing system 102 may be configured to customize a card 101 to be issued to a card user. Examples of operations performed by the card processing system 102 include, but are not limited to, card retrieval, barcode scanning, vision verification, magnetic strip encoding, integrated chip programming, graphics or logo printing, laser etching, laminating, top coating, embossing, and label affixing. The card processing system 102 may comprise a processor 106, a memory 108, an input/output (I/O) interface 110, a network interface 112, a user interface 114, a vision system 116, and card processing hardware 118.

The processor 106 may be implemented as one or more central processing unit (CPU) chips, logic units, cores (e.g. as a multi-core processor), field-programmable gate arrays (FPGAs), application specific integrated circuits (ASICs), or digital signal processors (DSPs). The processor 106 is operably coupled to and in signal communication with memory 108, I/O interface 110, network interface 112, user interface 114, vision system 116, and card processing hardware 118. The processor 106 is configured to receive and transmit electrical signals among one or more of the memory 108, I/O interface 110, network interface 112, user interface 114, vision system 116, and card processing hardware 118. The processor 106 may be operably coupled to one or more other devices (not shown). The processor 106 is configured to process data and may be implemented in hardware or software.

The processor 106 may be configured to implement card processing instructions 120. In FIG. 1, the card processing instructions 120 are implemented as instructions (e.g. software code or firmware) stored in the processor 106. In other embodiments, the card processing instructions 120 may be implemented as instructions stored in memory 108. The inclusion of card processing instructions 120 provides an improvement to the functionality of the card processing system 102 and the card issuing system 100, which effects a transformation of the card processing system 102 and the card issuing system 100 to a different state. The card processing instructions 120 are implemented by the processor 106 to execute instructions for processing cards 101. For example, executing the card processing instructions 120 may configure the processor 106 to process card requests 150, select cards 101 based on card requests 150, process 2D barcodes on selected cards 101 to obtain card feature data 121, obtain card data files 122, compare the card feature data 121 to card data files 122, process card 101 when the card feature data 121 corresponds with the card data file 122, and perform visual inspection when the card feature data 121 does not correspond with the card data file 122. In one embodiment, the card processing instructions 120 may configure the processor 106 to obtain visual card feature data 123 based on a captured image 117, to compare the visual card feature data 123 to a card data file 122, and to determine whether the visual card feature data 123 corresponds with the card data file 122 based on the comparison. In one embodiment, the card processing instructions 120 may configure the processor 106 to apply, for example, using the card processing hardware 118, a second 2D barcode associated with card processing information 124 to a card 101 when processing the card 101. An example of executing the card processing instructions 120 is described in FIG. 2.

The memory 108 may comprise one or more disks, tape drives, or solid-state drives, and may be used as an over-flow data storage device, to store programs when such programs are selected for execution, and to store instructions and data that are read during program execution. The memory 108 may be volatile or non-volatile and may comprise read-only memory (ROM), random-access memory (RAM), ternary content-addressable memory (TCAM), dynamic random-access memory (DRAM), and static random-access memory (SRAM). The memory 108 is operable to store system information, user information, card information, and/or any other data or instructions (e.g. card processing instructions 120).

The I/O interface 110 may comprise ports, transmitters, receivers, transceivers, or any other devices for transmitting and/or receiving data as would be appreciated by one of ordinary skill in the art upon viewing this disclosure. For example, the I/O interface 106 may be configured to communicate data between the processor 106 and peripheral hardware such as a mouse, a keyboard, or a touch sensor (e.g. a touch screen).

The network interface 112 may be configured to enable wired and/or wireless communications and to communicate data through a network, system, and/or domain. For example, the network interface 112 may comprise or may be integrated with a modem, a switch, a router, a bridge, a server, or a client. The processor 106 may be configured to send and to receive data using network interface 112 from a network or a remote source.

The user interface 114 may be configured to present information to a user using the card processing system 102. For example, the user interface 114 may comprise a graphical user interface (GUI). The GUI may be employed to provide interfaces that allow the operator to view and interact with programs executed on the card processing system 102. Examples of the user interface 114 include, but are not limited to, touch screens, a light emitting diode (LED) display, an organic LED (OLED) display, an active matric OLED (AMOLED), a projector display, a cathode ray (CRT) monitor, or any other suitable type of display as would be appreciated by one of ordinary skill in the art upon viewing this disclosure.

The vision system 116 may be configured to capture images 117 and/or visual information from cards. The vision system 116 may comprise a camera, a barcode reader (e.g. a 2D barcode reader), and/or any other devices for capturing visual information from cards 101 as would be appreciated by one of ordinary skill in the art upon viewing this disclosure. For example, the vision system 116 may comprise a camera and may be configured to capture images 117 of the faces or features (e.g. 2D barcodes, card holder names, and card numbers) of a card 101. In another example, the vision system 116 may comprise a barcode reader and may be configured to scan barcodes and 2D barcodes on a card 101. In one embodiment, the vision system 116 may be further configured to process captured visual information. For example, the vision system 116 may further comprise a DSP. In other embodiments, the vision system 116 may be configured to send the captured visual information to the processor 106 for processing.

The card processing hardware 118 may be configured to process cards 101 for issuing. For example, the card processing hardware 118 may be configured to configure a card 101 to be issued to a card user. Card processing hardware 118 may comprise a magnetic strip encoder, an integrated chip programmer, printing hardware, an embosser, a laser etcher, a laminator, and/or any other type of hardware for processing or configuring a card 101.

The card information database 104 is communicatively coupled to the card processing system 102. The card information database 104 may be configured to store card information and card data files 122 and to provide card information and card data files 122 to the card processing system 102. Card information may comprise card types, card user information, names, account numbers, expiration dates, and/or any other type of card information as would be appreciated by one of ordinary skill in the art upon viewing this disclosure. In one embodiment, the card information database 104 may be external to the card processing system 102. For example, the card information databases 104 may be in a different geographic location than the card processing system 102 and may be communicatively coupled to the card processing system 102 using a network connection. In another embodiment, the card information database 104 may be integrated with the card processing system 102. Card data files 122 may comprise information that indicates a card type, card configuration, integrated chip type, integrated chip version, integrated chip programming code version, card theme, card design, card options, part number, manufacture date, manufacture location, or any other information about a card.

Figure 2:
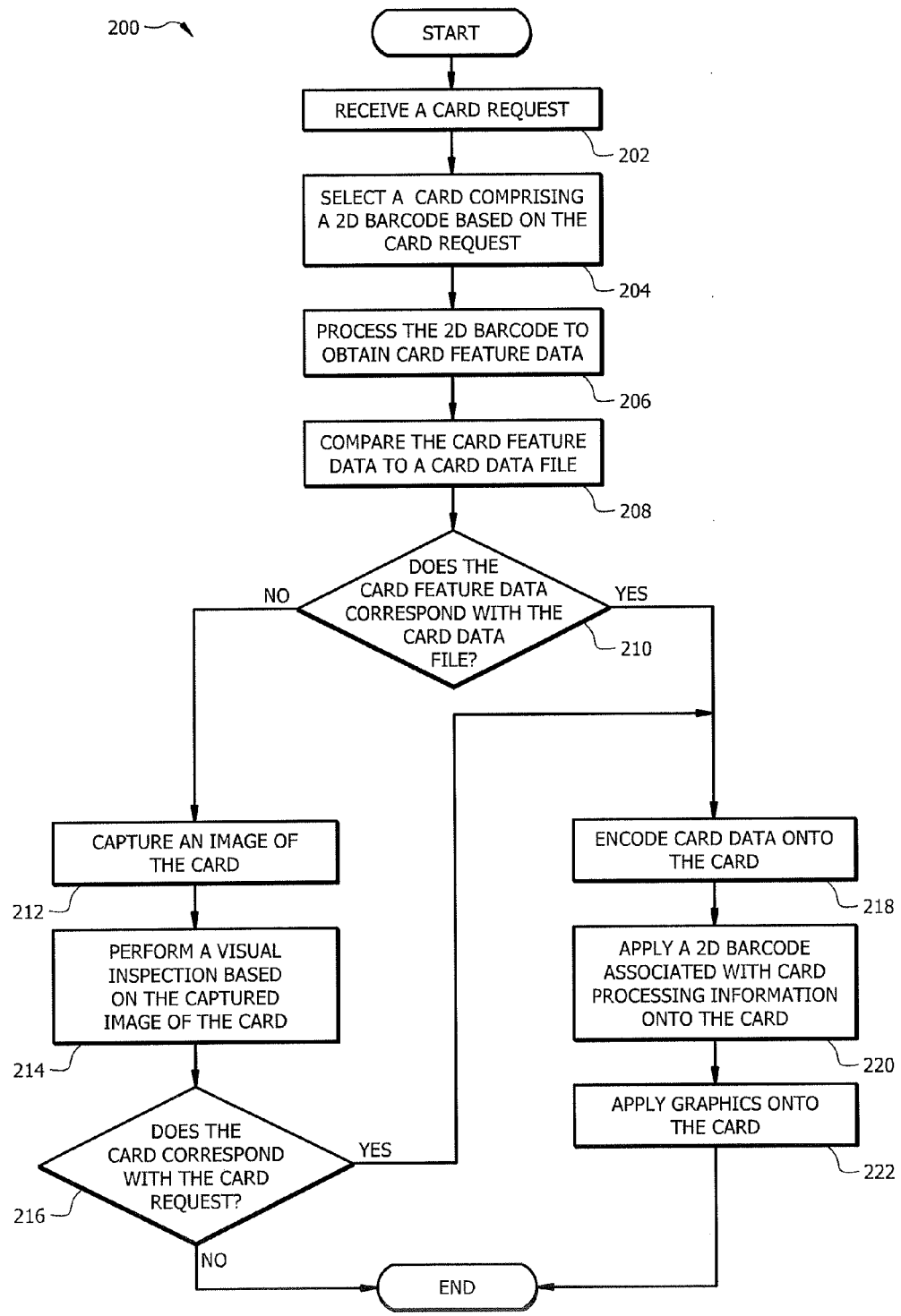
FIG. 2 is a flowchart of an embodiment of card generating method using a card issuing system.

FIG. 2 is a flowchart of an embodiment of card generating method 200 using a card issuing system 100. Method 200 may be implemented by a card processing system 102 to process one or more cards for issuing in response to card requests 150. The card processing system 102 may receive a card request 150 from an operator and may configure a card 101 for issuing to a card user. The card processing system 102 may obtain card feature data 121 from the card using 2D barcodes to verify the appropriate card has been selected prior to processing the card 101.

At step 202, the card processing system 102 receives a card request 150 at an interface (e.g. user interface 114, I/O interface 110, or network interface 112). The card request 150 may comprise card specifications for the card. For example, the card specifications may indicate a particular card type, card configuration, integrated chip type, integrated chip version, integrated chip programming code version, card theme, card design, card options, part number, manufacture date, manufacture location, or any other suitable card specifications or requirements.

At step 204, the card processing system 102 selects a card 101 comprising a 2D barcode based on the card request 150. For example, the card processing system 102 may identify and/or obtain a card 101 with a 2D barcode that corresponds with the information in the card request 150.

At step 206, the card processing system 102 processes the 2D barcode to obtain card feature data 121. In one embodiment, the card processing system 102 may capture an image 117 of the 2D barcode and may process the captured image 117 to obtain the card feature data 121. In another embodiment, the card processing system 102 may employ a 2D barcode reader to obtain the card feature data 121. Card feature data 121 may comprise information associated with the card 101, for example, the physical structure or configuration of the card 101. For example, card feature data 121 may comprise information that indicates a card type, card configuration, integrated chip type, integrated chip version, integrated chip programming code version, card theme, card design, card options, part number, manufacture date, manufacture location, or any other information about the card 101.

At step 208, the card processing system 102 compares the card feature data 121 to the card data file 122. The card processing system 102 may use card specifications from the card request 150 to identify and/or obtain a card data file 122 from a card information database 104. The card processing system 102 may compare information from the card feature data 121 with information from the card data file 122.

At step 210, the card processing system 102 determines whether the card feature data 121 corresponds with the card data file 122. The card processing system 102 may determine that the card feature data 121 corresponds with the card data file 122 when the information from the card feature data 121 matches the information from the card data file 122. The card processing system 102 may determine that the card feature data 121 does not correspond with the card data file 122 when the information from the card feature data 121 does not match the information from the card data file 122. The card processing system 102 proceeds to step 212 when the card feature data 121 does not correspond with the card data file 122. Otherwise, the card processing system 102 proceeds to step 218 when the card feature data 121 corresponds with the card data file 122.

The card processing system 102 may perform a visual inspection of the card 101 to determine whether the selected card 101 corresponds with the requested card in the card request 150 when the card feature data 121 does not correspond with the card data file 122. At step 212, the card processing system 102 captures an image 117 of the card 101. The card processing system 102 may capture an image 117 of the front side and/or the back side of the card 101. In some embodiments, the card processing system 102 may only capture images 117 of portions (e.g. part numbers) of the card 101.

At step 214, the card processing system 102 performs a visual inspection based on the captured image 117 of the card 101. In one embodiment, the card processing system 102 may compare the captured image 117 of the card 101 to images 117 of other known cards. The card processing system 102 may obtain images 117 of other known cards based on information provided in the card request 150. For example, the card processing system 102 may access a repository of stored card images from a memory (e.g. memory 108 or card information database 104) to obtain images 117 of known cards for comparison. In another embodiment, the card processing system 102 may allow an operator to perform a manual inspection of the card 101. For example, the card processing system 102 may display the captured image 117 of the card 101 to an operator to allow the operator to inspect the card 101.

At step 216, the card processing system 102 determines whether the card corresponds with the card request 150 based on the visual inspection results. For example, the card processing system 102 may use imaging software to compare features and/or information on the selected card to features and/or information on other known cards. The card processing system 102 may determine that that the selected card 101 corresponds with the card request 150 when features of the card and/or information on the card 101 matches with the features and/or information on other known cards. The card processing system 102 may determine that that the selected card 101 does not correspond with the card request 150 when features of the card and/or information on the card 101 do not match with the features and/or information on other known cards. In one embodiment, the card processing system 102 may determine whether the card 101 corresponds with the card request 150 based on an indication from an operator, for example, following a manual visual inspection. The card processing system 102 proceeds to step 218 when the card processing system 102 determines that the card 101 corresponds with the card request 150. Otherwise, the card processing 102 may terminate method 200 when the card processing system 102 determines that the card 101 does not correspond with the card request 150. In one embodiment, the card processing system 102 may trigger an alert or notification when the card 101 does not correspond with the card request 150. For example, the alert may notify an operator about potential card processing issues.

Returning to step 210, the card processing system 102 proceeds to step 218 when the card feature data 121 corresponds with the card data file 122. The card processing system 102 may process the selected card 101 for issuing when the card processing system 102 determines that the card feature data 121 corresponds with the card data file 122. At step 218, the card processing system 102 encodes card data onto the card 101. The card processing system 102 may encode a magnetic strip on the card, program an integrated chip on the card, and/or any other process for encoding or programming data onto the card 101.

At step 220, the card processing system 102 applies a second 2D barcode associated with card processing information 124 onto the card. The card processing system 102 may print or apply the second 2D barcode to any location on the card. The card processing information 124 may comprise a processing or issue date, processing machine information (e.g. machine number), processing location, integrated chip code versions, card processing script versions, and/or any other information associated with the processing or issuing of the card 101. In some embodiment, step 220 may be optional and may be omitted.

Optionally, at step 222, the card processing system 102 applies graphics onto the card 101. The card processing system 102 may stylize or customize the card 101. For example, the card processing system 102 may print or apply designs, logos, text, or labels onto the card 101.

Figure 3:
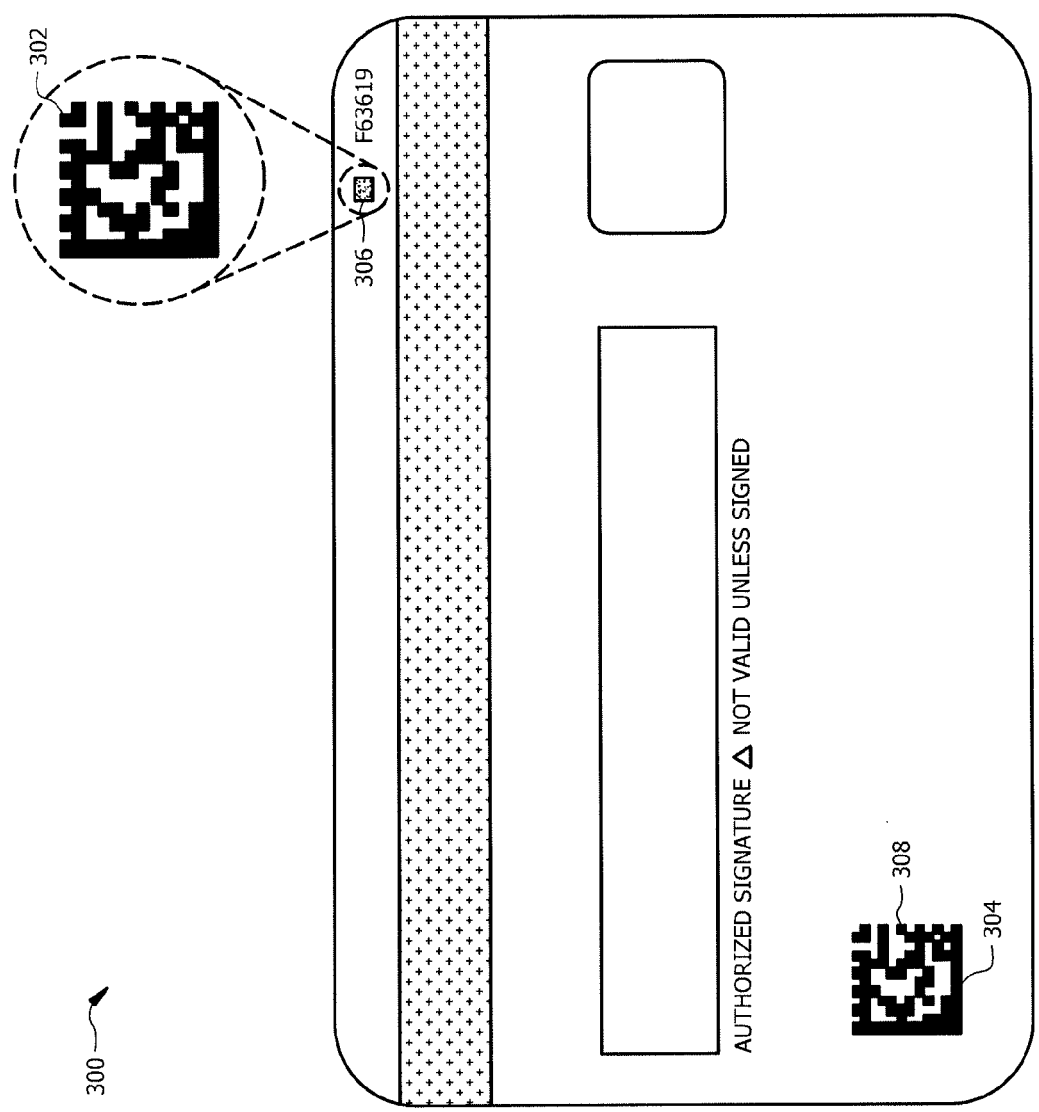
FIG. 3 is a profile view of an embodiment of a card with two-dimensional barcodes.

FIG. 3 is a profile view of an embodiment of a card 300 (e.g. card 101) with 2D barcodes 302 and 304. The card 300 comprises a first 2D barcode 302 at a first location 306 on the card 300 and a second 2D barcode 304 at a second location 308 on the card 300. Examples of 2D barcodes include, but are not limited to, Aztec Codes, MaxiCodes, quick response (QR) codes, Data matrix, EZ code, and portable data file 417 (PDF 417) codes. In other embodiments, the first 2D barcode 302 and the second 2D barcode 304 may be in any other locations on the card 300. For example, the first 2D barcode 302 and the second 2D barcode 304 may be positioned adjacent to each other. In some embodiments, the first 2D barcode 302 and the second 2D barcode 304 may be same size or type of 2D barcode. In other embodiments, the first 2D barcode 302 and the second 2D barcode 304 may be different sizes and/or types of 2D barcodes. FIG. 3 illustrates the first 2D barcode 302 and the second 2D barcode 304 both on the back side of the card 300. In other embodiments, the first 2D barcode 302 and/or the second 2D barcode 304 may be on the front side of the card 300. For example, the first 2D barcode 302 may be on one side (e.g. the back side) of the card 300 and the second 2D barcode 304 may be on the other side (e.g. the front side) of the card 300. In another example, the first 2D barcode 302 and the second 2D barcode 304 may both be on the front side of the card 300. The first 2D barcode 302 and the second 2D barcode 304 may be associated with any information for the card 300. For example, the first 2D barcode 302 and the second 2D barcode 304 may be associated with card feature data 121, card processing information 124, or any other suitable information. The first 2D barcode 302 and the second 2D barcode 304 may be associated with the same information, for example, for redundancy, or may be associated with different information.

Figure 4:
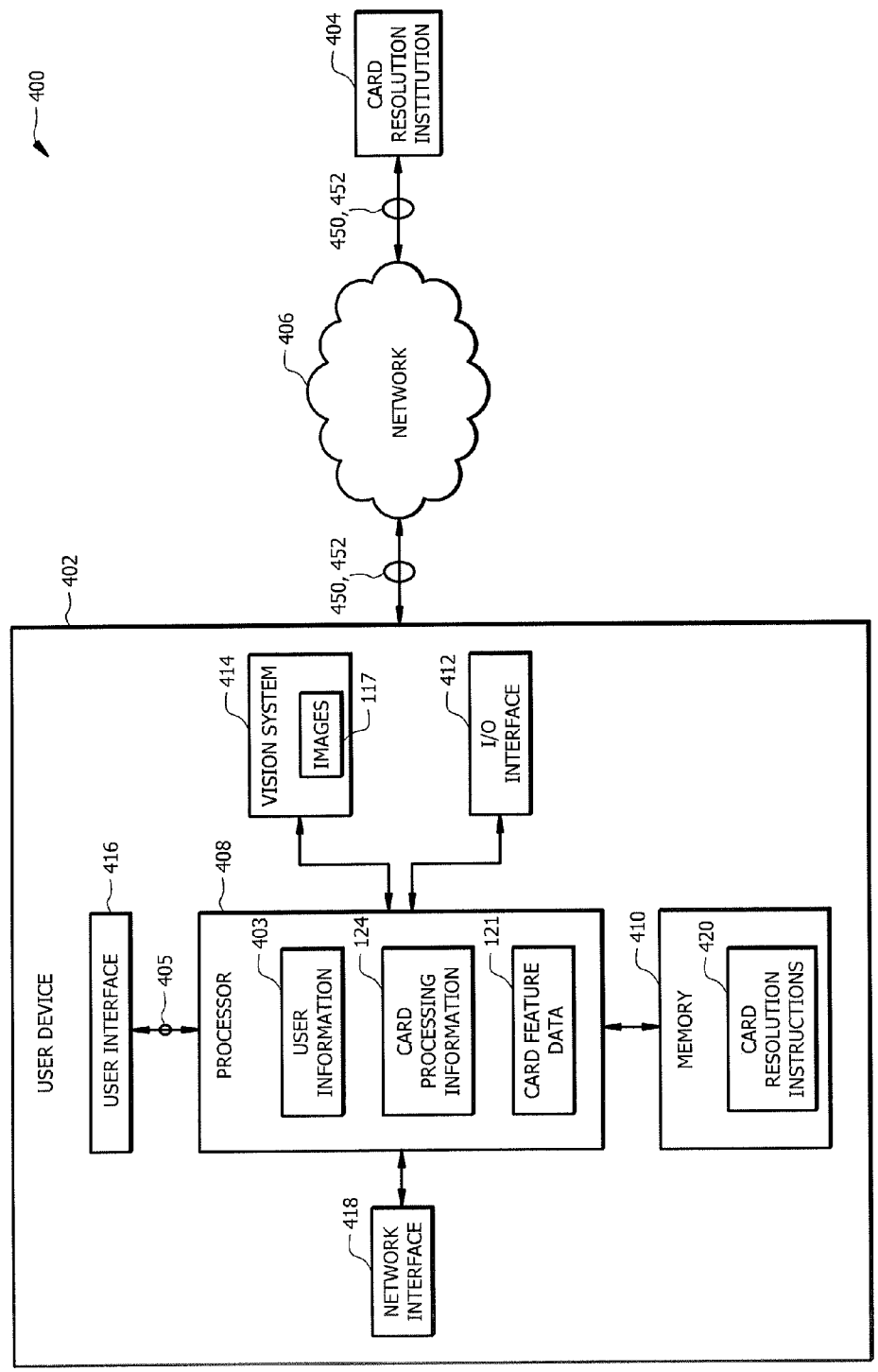
FIG. 4 is a schematic view of an embodiment of card resolution system.

FIG. 4 is a schematic view of an embodiment of card resolution system 400. The card resolution system 400 may be configured to collect and communicate information for diagnosing and resolving problems associated with cards. For example, a card user may experience a problem when trying to use a card 101 and may employ the card resolution system 400 to transmit information associated with the card 101 for diagnosing and resolving problems with the card 101. The card user may receive a response that may indicate remediation actions or notifications.

The card resolution system 400 may comprise a user device 402 configured to communicate with a card resolution institution 404 via a network 406. The card resolution system 400 may be configured as shown or in any other suitable configuration.

The user device 402 may be configured to obtain information associated with a card 101 and to transmit the obtained information to the card resolution institution 404. For example, the user device 402 may be configured to obtain information comprising card processing information 124 from a first 2D barcode on a card, card feature data 121 from a second 2D barcode on the card, and/or user information 403 when the card user experiences a problem with the card 101. The user device 402 is further configured to send the obtained information to the card resolution institution 404.

Examples of the user device 402 include, but are not limited to, mobile phones, smart phones, notebook computers, tablet computers, desktop computers, or any other suitable device as would be appreciated by one of ordinary skill in the art upon viewing this disclosure. The user device 402 may comprise a processor 408, a memory 410, an I/O interface 412, a vision system 414, a user interface 416, and a network interface 418.

The processor 408 may be implemented as one or more CPU chips, logic units, cores (e.g. as a multi-core processor), FPGAs, ASICs, or DSPs. The processor 408 is operably coupled to and in signal communication with memory 410, I/O interface 412, vision system 414, user interface 416, and network interface 418. The processor 408 is configured to receive and transmit electrical signals among one or more of memory 410, I/O interface 412, vision system 414, user interface 416, and network interface 418. The processor 408 may be operably coupled to one or more other devices (not shown). The processor 408 is configured to process data and may be implemented in hardware or software.

The memory 410 may comprise one or more disks, tape drives, or solid-state drives, and may be used as an over-flow data storage device, to store programs when such programs are selected for execution, and to store instructions and data that are read during program execution. The memory 108 may be volatile or non-volatile and may comprise ROM, RAM, TCAM, DRAM, and SRAM. The memory 410 is operable to store card resolution instructions 420, applications, system information, user information, card information, and/or any other data or instructions. In one embodiment, card resolution instructions 420 may a stand alone application or incorporated within another application.

The processor 408 may be configured to implement card resolution instructions 420. In FIG. 4, the card resolution instructions 420 are implemented as instructions (e.g. software code or firmware) stored in the memory 410. In other embodiments, the card resolution instructions 420 may be implemented as instructions stored in the processor 408. The inclusion of card resolution instructions 420 provides an improvement to the functionality of the user device 402, which effects a transformation of the user device 402 to a different state. The card resolution instructions 420 is implemented by the processor 408 to execute instructions for obtaining information associated with a card 101 and a card user and sending the card information to a card resolution institution 404. For example, executing the card resolution instructions 420 may configure the processor 408 to collect information from 2D barcodes on a card 101, process 2D barcodes to obtain card processing information 124 and/or card feature data 124, obtain user information 403, generate a resolution request message 450 comprising the collected information, and send the resolution request message 450 to a card resolution institution 404. Examples of executing card resolution instructions 420 are described in FIGS. 5 and 6.

In one embodiment, executing the card resolution instructions 420 may configure the processor 408 to implement one or more security protocols. For example, the processor 408 may be configured to prompt a user for user credentials 405. The processor 408 may process received user credentials 405 to authenticate or validate the identity of a user. The processor 408 may be configured to authenticate the user or send the user credentials 405 to another entity for authentication. Authenticating the user may also allow the user device to access user information 403 associated with the user. The processor 408 may also be configured to employ message encryption, for example, to encrypt messages (e.g. resolution request messages 450) prior to sending messages. The processor 408 may be configured to employ any suitable encryption technique.

The I/O interface 412 may comprise ports, transmitters, receivers, transceivers, or any other devices for transmitting and/or receiving data as would be appreciated by one of ordinary skill in the art upon viewing this disclosure. For example, the I/O interface 412 may be configured to communicate data between the processor 106 and peripheral hardware such as a keyboard, buttons, or a touch sensor (e.g. a touch screen).

The vision system 414 may be configured to capture images 117 and/or visual information from cards. The vision system 414 may comprise a camera, a barcode reader (e.g. a 2D barcode reader), and/or any other devices for capturing visual information from cards 101 as would be appreciated by one of ordinary skill in the art upon viewing this disclosure. For example, the vision system 414 may comprise a camera and may be configured to capture images 117 of the faces or features (e.g. 2D barcodes, card holder names, and card numbers) of a card 101. The vision system 414 may comprise a barcode reader and may be configured to scan barcodes and 2D barcodes on a card 101. In one embodiment, the vision system 414 may be configured to send the captured visual information to the processor 408 for processing.

The user interface 416 may be configured to present information to a user using the user device 402. For example, the user interface 416 may comprise a GUI.

The GUI may be employed to provide interfaces that allow the operator to view and interact with applications or instructions (e.g. card resolution instructions 420) executed on the user device 416. Examples of the user interface 416 include, but are not limited to, a display screen, a touch screen, or any other suitable type of display as would be appreciated by one of ordinary skill in the art upon viewing this disclosure.

The network interface 418 may be configured to enable wired and/or wireless communications and to communicate data through a network, system, and/or domain. In one embodiment, the network interface 418 may comprise hardware for communicating using a cellular network. For example, the network interface 418 may comprise one or more antennas, transmitters, receivers, and/or transceivers. In another embodiment, the network interface 418 may comprise or may be integrated with a modem, a switch, a router, a bridge, a server, or a client. The processor 106 may be configured to send data and receive data using network interface 418.

Examples of the card resolution institution 404 include, but are not limited to, a card issuing institution, a card processing institution, a financial institution (e.g. a bank), a retailer, a credit institution, and a card management institution. The card resolution institution 404 may be configured to receive information associated with a card 101, to process the received information, to diagnose or troubleshoot issues based on the received information, and to remediate card issues. For example, the card resolution institution 404 may be configured to receive information associated with a card 101 and troubleshoot issues with the card 101 by checking machines or scripts associated with the processing and issuing of the card 101. Any diagnosing or troubleshooting techniques may be employed as would be appreciated by one of ordinary skill in the art upon viewing this disclosure. In one embodiment, the card resolution institution 404 may be configured to receive codes or tokens corresponding with information associated with a card 101 and to process the received codes or tokens to obtain the information associated with the card 101. The card resolution institution 404 may be further configured to resolve card issues. Examples of card resolution actions may include, but are not limited to, replacing a card 101, repairing a card 101, and sending instruction to a card user. For example, the card resolution institution 404 may be configured to send a resolution response message 452 to a card user. The resolution response message 452 may comprise an acknowledgement of the reported issues and/or instructions for the card user.

The network 406 may be configured to communicate data (e.g. resolution request messages 450 and/or resolution response messages 452) between the user device 402 and the card resolution institution 404. In one embodiment, the network 406 may comprise or may be a cellular network. In other embodiments, the network 406 may be any other suitable type of wireless or wired network. The network 406 may be configured to support any suitable communication protocols as would be appreciated by one of ordinary skill in the art upon viewing this disclosure.

Figure 5:
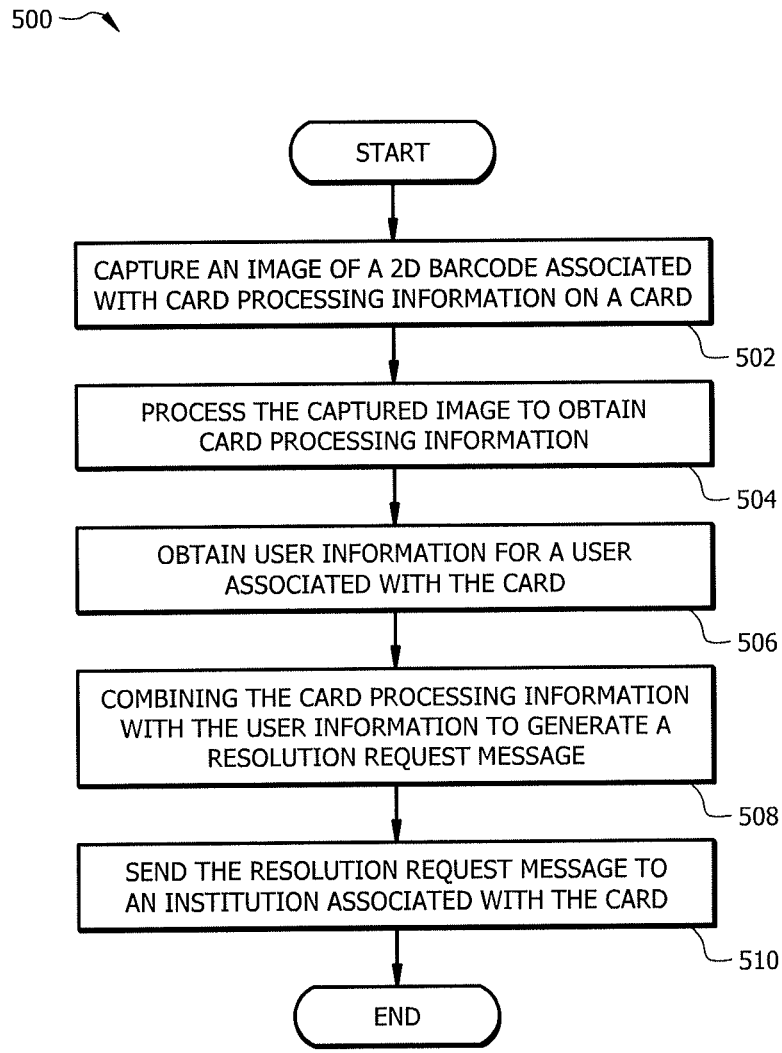
FIG. 5 is a flowchart of an embodiment of a card resolution method.

FIG. 5 is a flowchart of an embodiment of a card resolution method 500. Method 500 may be implemented by a user device 402 to transmit information associated with a card 101 for diagnosing and resolving problems with the card 101. For example, a card user may experience an issue with their card 101 at a point-of-sales (PoS) device. The card user may then employ a user device 402 to collect card processing information 124 and user information 403 associated with the card 101 and to transmit the collected information to a card resolution institution 404 for diagnosing problems associated with the card 101.

In one embodiment, the card user may provide user credential 405 to the user device 402. The user device 402 may authenticate the card user prior to allowing the card user to collect and/or transmit information for a card 101. At step 502, the user device 402 captures an image 117 of a 2D barcode associated with card processing information 124 from the card 101. The user device 402 may employ the vision system 414 (e.g. a camera) to capture an image 117 of the 2D barcode associated with card processing information 124 on the card 101.

At step 504, the user device 402 processes the captured image 117 to obtain card processing information 124. The card processing information 124 may comprise a processing or issue date, processing machine information (e.g. machine number), processing location, integrated chip code versions, card processing script versions, and/or any other information associated with the processing or issuing of the card 101. In one embodiment, the user device 402 may process the captured image 117 and obtain a card processing information code or token associated with the card processing information 124. The card processing information code may be processed by an institution associated with the card 101 to obtain the card processing information 124. Any suitable code or token type may be employed for the card processing information code or token.

At step 506, the user device 402 obtains user information 403 for a user associated with the card 101. User information 403 may include, but is not limited to, a name, an account number, and a card number. In one embodiment, the card user may provide user information 403 to the user device 402. In another embodiment, the user device 402 may obtain user information 403 from one or more images 117 of the card 101. For example, the user device 402 may capture an image 117 of the front side and/or the back side of the card 101 to obtain user information 403 (e.g. a name or card number). In another embodiment, the user device 402 may obtain user information 403 from a memory (e.g. memory 410) or database. For example, the user device 102 may use the user credentials 405 provided by the card user to identify or request user information 403.

At step 508, the user device 402 combines the card processing information 124 with the user information 403 to generate a resolution request message 450. For example, the user device 402 may combine the card processing information 124 with the user information 403 as a payload of the resolution request message 450. In another example, the user device 402 may combine a card processing information code or token with the user information 403 to generate the resolution request message 450. Generating the resolution request message 450 may comprise a transformation of the card processing information 124 and/or the user information 403 to a different data type or format. In one embodiment, the user device 402 may encrypt the resolution request message 450. The user device 402 may employ any suitable encryption technique as would be appreciated by one of ordinary skill in the art upon viewing this disclosure. At step 510, the user device 402 sends the resolution request message 450 to an institution associated with the card 101, for example, a card resolution institution 404.

In one embodiment, the user device 402 may receive a resolution response message 452 from the institution associated with the card 101. For example, the user device 402 may receive an acknowledgment, resolution actions taken, and/or instructions for the card user.

Figure 6:
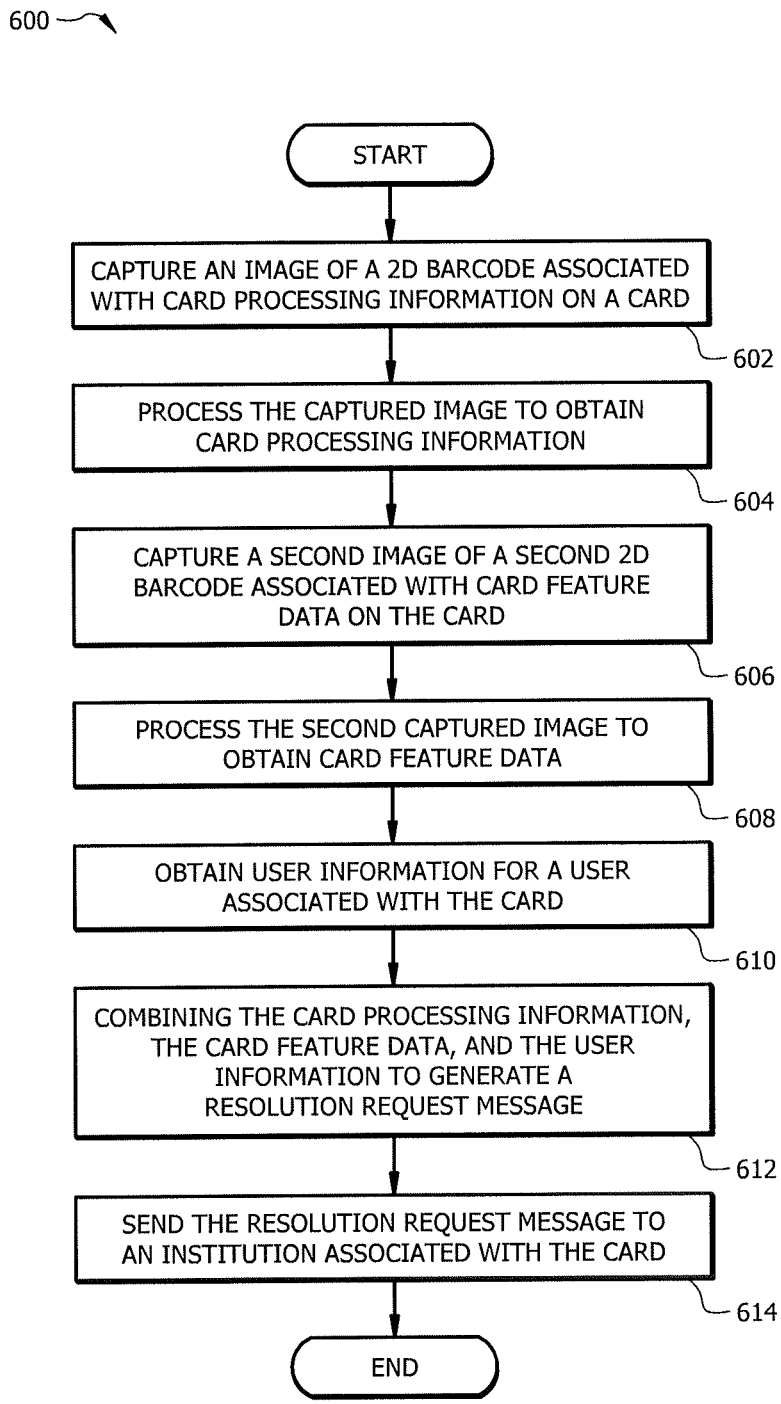
FIG. 6 is a flowchart of another embodiment of a card resolution method.

FIG. 6 is a flowchart of another embodiment of a card resolution method 600. Method 600 may be employed by a user device 402 to transmit information associated with a card 101 for diagnosing and resolving problems with the card 101. The user device 402 may collect card processing information 124, card feature data 121, and user information 403 and transmit the collected information to a card resolution institution 404 for diagnosing problems associated with the card 101.

In one embodiment, the card user may provide user credential 405 to the user device 402. The user device 402 may authenticate the card user prior to allowing the card user to collect and/or transmit information for a card 101. At step 602, the user device 402 captures an image 117 of a 2D barcode associated with card processing information 124 from the card 101. The user device 402 may employ the vision system 414 (e.g. a camera) to capture an image 117 of the 2D barcode associated with card processing information 124 on the card 101.

At step 604, the user device 402 processes the captured image 117 to obtain card processing information 124. The card processing information 124 may comprise a processing or issue date, processing machine information (e.g. machine number), processing location, integrated chip code versions, card processing script versions, and/or any other information associated with the processing or issuing of the card 101. In one embodiment, the user device 402 may process the captured image 117 and obtain a card processing information code or toke associated with the card processing information 124.

At step 606, the user device 402 captures a second image 117 of a second 2D barcode associated with card feature data 121 from the card 101. The user device 402 may employ the vision system 414 to capture a second image 117 of a 2D barcode associated with card feature data 121 on the card 101.

At step 608, the user device 402 processes the second captured image 117 to obtain card feature data 121. The card feature data 121 may comprise information that indicates a card type, card configuration, integrated chip type, integrated chip version, integrated chip programming code version, card theme, card design, card options, part number, manufacture date, manufacture location, or any other information about the card 101. In one embodiment, the user device 402 may process the second captured image 117 to obtain a card feature data code or token associated with the card feature data 121. The card feature data code may be processed by an institution associated with the card 101 to obtain the card feature data 121. Any suitable code or token type may be employed for the card feature data code or token.

At step 610, the user device 402 obtains user information 403 for a user associated with the card 101. In one embodiment, the card user may provide user information 403 to the user device 402. In another embodiment, the user device 402 may obtain user information 403 from one or more images 117 of the card, for example, an image 117 of the front side and/or the back side of the card 100. In another embodiment, the user device 402 may obtain user information 403 from a memory (e.g. memory 410) or database.

At step 612, the user device 402 combines the card processing information 124, the card feature data 121, and the user information 403 to generate a resolution request message 450. For example, the user device 402 may combine the card processing information 124, the card feature data 121, and the user information 403 as a payload of the resolution request message 450. In another example, the user device 402 may combine a card processing information token, a card feature data token, and the user information 403 to generate the resolution request message 450. Generating the resolution request message 450 may comprise a transformation of the card processing information 124, the card feature data 121, and/or the user information 403 to a different data type or format. In one embodiment, the user device 402 may encrypt the resolution request message 450. The user device 402 may employ any suitable encryption technique as would be appreciated by one of ordinary skill in the art upon viewing this disclosure. At step 614, the user device 402 sends the resolution request message 150 to an institution associated with the card 101, for example, a card resolution institution 404.

In one embodiment, the user device 402 may receive a resolution response message 452 from the institution associated with the card 101. For example, the user device 402 may receive an acknowledgment, resolution actions taken, and/or instructions for the card user.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. §112(f) as it exists on the date of filing hereof unless the words "means for" or "step for" are explicitly used in the particular claim.

The invention claimed is:

1. A card generating system comprising:
   a card information database operable to store card data files;
   a card processing system operably coupled to the card information database, and comprising:
   an interface configured to receive a card request;

a vision system configured to process two-dimensional barcodes to obtain card feature data;
a processor operably coupled to the interface, the vision system, and card processing hardware, and configured to:
select a card comprising a two-dimensional barcode based on the card request;
obtain a card data file corresponding with the card request;
compare card feature data to the card data file;
determine whether the card feature data corresponds with the card data file; and
the card processing hardware configured to process the card in response a determining the card feature data corresponds with the card data file, wherein:
processing the card comprises applying a second two-dimensional barcode to the card, and
the second two-dimensional barcode is associated with card processing information for the card.

2. The system of claim 1, wherein processing the card comprises encoding card data onto a magnetic strip of the card.

3. The system of claim 1, wherein processing the card comprises programming a chip on the card.

4. The system of claim 1, wherein the processor is configured to perform a visual inspection of the card in response to determining that the card feature data does not correspond with the card data file.

5. The system of claim 1, wherein:
the vision system is configured to capture an image of the of the card in response to determining that the card feature data does not correspond with the card data file;
the processor is configured to:
obtain visual card feature data based on the captured image; and
compare the visual card feature data to the card data file; and
determine whether the visual card feature data corresponds with the card data file; and
the card processing hardware is configured to process the card in response to determining the visual card feature data corresponds with the card data file.

6. An apparatus comprising:
an interface configured to receive a card request;
a vision system configured to process two-dimensional barcodes to obtain card feature data;
a processor operably coupled to the interface, the vision system, and card processing hardware, and configured to:
select a card comprising a two-dimensional barcode based on the card request;
compare card feature data to a card data file corresponding with the card request;
determine whether the card feature data corresponds with the card data file; and
the card processing hardware configured to process the card in response a determining the card feature data corresponds with the card data file, wherein:
processing the card comprises applying a second two-dimensional barcode to the card, and
the second two-dimensional barcode is associated with card processing information for the card.

7. The apparatus of claim 6, wherein processing the card comprises encoding card data onto a magnetic strip of the card.

8. The apparatus of claim 6, wherein processing the card comprises programming a chip on the card.

9. The apparatus of claim 6, wherein the processor is configured to perform a visual inspection of the card in response to determining that the card feature data does not correspond with the card data file.

10. The apparatus of claim 6, wherein:
the vision system is configured to capture an image of the of the card in response to determining that the card feature data does not correspond with the card data file;
the processor is configured to:
obtain visual card feature data based on the captured image; and
compare the visual card feature data to the card data file; and
determine whether the visual card feature data corresponds with the card data file; and
the card processing hardware is configured to process the card in response to determining the visual card feature data corresponds with the card data file file.

11. The apparatus of claim 6, wherein the card request comprises card specification; and
the processor is configured to obtain the card data file based on the card specifications.

12. A card generating method comprising:
receiving, at an interface, a card request;
selecting, by a processor, a card comprising a two-dimensional barcode based on the card request;
processing, by a vision system, the two-dimensional barcode to obtain card feature data;
comparing, by the processor, the card feature data to a card data file corresponding with the card request;
determining, by the processor, whether the card feature data corresponds with the card data file; and
processing, using card processing hardware, the card in response to determining the card feature data corresponds with the card data file, wherein:
processing the card comprises applying a second two-dimensional barcode to the card, and
the second two-dimensional barcode is associated with card processing information for the card.

13. The method of claim 12, wherein processing the card comprises encoding card data onto a magnetic strip of the card.

14. The method of claim 12, wherein processing the card comprises programming a chip on the card.

15. The method of claim 12, further comprising performing a visual inspection of the card in response to determining that the card feature data does not correspond with the card data file.

16. The method of claim 12, further comprising:
capturing, by the vision system, an image of the of the card in response to determining that the card feature data does not correspond with the card data file; and
obtaining, by the processor, visual card feature data based on the captured image; and
comparing, by the processor, the visual card feature data to the card data file;
determining, by the processor, whether the visual card feature data corresponds with the card data file; and
processing, using card processing hardware, the card in response to determining the visual card feature data corresponds with the card data file.

17. The method of claim 12, wherein the card request comprises card specification; and
further comprising, by the processor, obtaining the card data file based on the card specifications.

* * * * *